Nov. 10, 1925.
E. H. BELDEN
1,561,205.
ENGINE SUPPORT
Original Filed July 26, 1917
Fig. I.
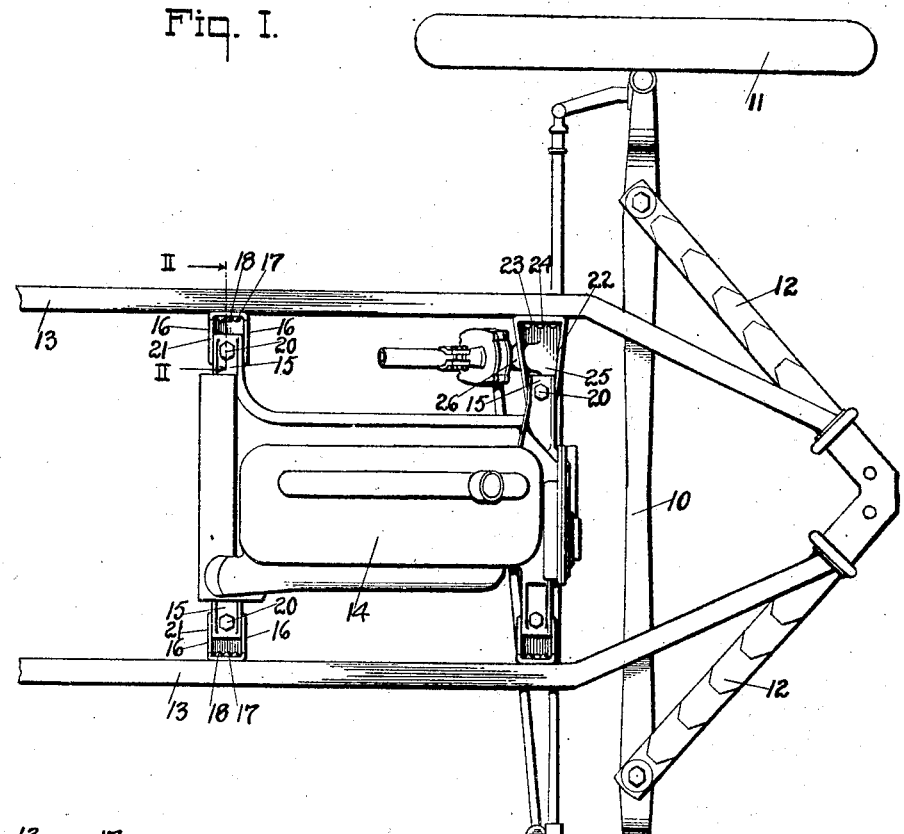
Fig. II.
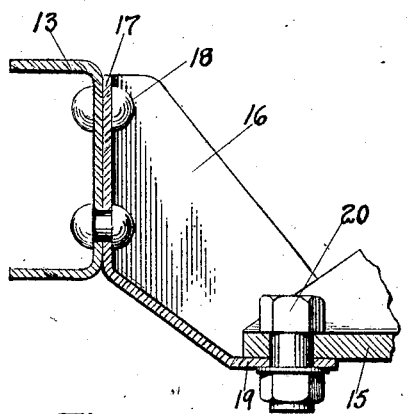
Fig. III.
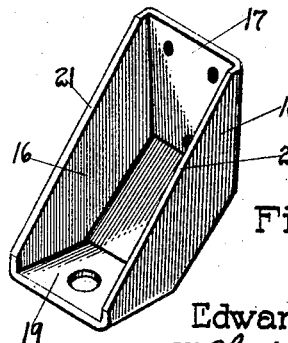
INVENTOR.
Edward H. Belden.
BY
ATTORNEYS.

Patented Nov. 10, 1925.

1,561,205

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

ENGINE SUPPORT.

Original application filed July 26, 1917, Serial No. 182,857. Divided and this application filed April 7, 1920. Serial No. 371,812.

*To all whom it may concern:*

Be it known that I, EDWARD H. BELDEN, residing at Toledo, county of Lucas, State of Ohio, have invented certain new and useful Improvements in Engine Supports, of which I declare the following to be a full, clear, and exact description.

This invention relates to improvements in engine supports and particularly engine supports for automobiles, the construction and arrangement of the supports being such that one of the brackets serves as a support for the steering mechanism. This application is a division of my application, Serial No. 182,857, filed July 26, 1917, patented February 19, 1924, Number 1,484,319.

The principal object of this invention is to provide supporting means to carry the engine base by the vehicle frame.

A further object of this invention is to provide supporting means for the engine so arranged that one of the brackets serves as a support for the steering mechanism.

Further objects relating to economies of manufacture and details of construction will definitely appear from the detailed description to follow.

I accomplish the objects of my invention in one instance by the devices and means described in the following specification and my invention is clearly defined and pointed out in the appended claims.

A structure constituting one embodiment of my invention is illustrated in the accompanying drawing, forming a part of this specification, in which:

Figure I is a top plan view of the forward part of the motor vehicle frame, in which my invention is embodied.

Figure II is a detailed sectional view substantially on the line II—II of Figure I, showing in detail the bracket between the engine base and the frame.

Figure III is a perspective view of one of the brackets used for connecting the engine base to the frame.

In the drawing similar reference numerals refer to similar parts throughout the several views, and the sectional view is taken looking in the direction of the arrows at the ends of the section line.

Considering the numbered parts of the drawing, I have shown the forward part of a motor vehicle having a front axle 10 on which the front steering wheels 11 are mounted, said front axle supporting springs 12 which carry the vehicle frame 13. In the present instance I have shown the frame as channel shape in cross-section and the same may have its flanges projecting outwardly thus permitting a smooth surface to which the engine supporting brackets may be secured.

An internal combustion engine 14 has an engine base provided with ears 15 at the corners thereof by means of which the engine is supported from the frame. The support of three corners of the engine is effected through the brackets 16 which are similar and interchangeable, and which have an end portion 17 extending vertically and fastened to the frame 13 by means of the rivets 18, and a portion 19 extending horizontally upon which the ear 15 of the engine base is adapted to seat, said ear being secured to the horizontal portion 19 of the bracket by means of the bolt 20. The box-like brackets 16 also have inclined side portions 21 which serve to make the bracket very rigid and makes possible a very light construction.

At the forward left hand corner of the engine, when the left hand drive is desired, I provide a bracket 22 having a vertical portion 23 secured to the frame 13 by means of rivets 24 and the horizontal portion 25 upon which the corresponding ear 15 extending from the engine base is adapted to seat and is secured by means of the bolt 20. A portion 26 extends downwardly and rearwardly from the bracket 22 and supports the steering column as is clearly explained in my co-pending application, Serial No. 182,857, filed July 26, 1917.

From the description of the parts given above the invention should be readily understood. The inclined brackets which support the projecting ears are so designed that they may be interchangeable and from the drawings it will be seen that they form a very rigid and substantial support for the engine. It will also be observed that I have departed from the conventional frame construction, in that the channel shaped side rails have their flanges projecting outwardly thus affording a smooth surface for the box-like brackets which may be so designed that they will support the ears of the engine base in a plane below the frame. Because of this construction which allows a low mounting of the engine, the propeller shaft (not shown) may be mounted in nearly a horizontal line between the rear axle and engine, thus affording a smoother driving connection than when the universal joints have to compensate for the angle of the propeller shaft.

What I claim as new and desire to claim by Letters Patent is:

1. In combination, a frame having channel shaped side members the flanges of which project outwardly, an engine base provided with ears, and a plurality of sheet metal box-like brackets having side, base, and end portions, the end portions being at substantially right angles with respect to each other and inclined to the base portions, said brackets being adapted to be secured to the inner face of said side members and supporting said engine base in a plane below said frame.

2. In combination, a frame comprising a side member having an inner vertical face and a sheet metal supporting bracket secured to said face, said bracket having a box-like form comprising two ends at right angels to each other and connected together by two opposed side portions and by a base portion inclined to each of said ends.

In testimony whereof, I affix my signature.

EDWARD H. BELDEN.